United States Patent
Ishida et al.

(10) Patent No.: US 6,750,898 B1
(45) Date of Patent: Jun. 15, 2004

(54) TOPDRESSING METHOD AND APPARATUS THEREFOR

(75) Inventors: Shigeki Ishida, Hokkaido (JP); Masakazu Toyoda, Hokkaido (JP); Kinya Masuda, Hokkaido (JP)

(73) Assignees: Incorporated Administrative Agency, Ibaraki (JP); National Agriculture, Ibaraki (JP); Bio-Oriented Research Organization, Ibaraki (JP)

( * ) Notice: Subject to any disclaimer, the term of this patent is extended or adjusted under 35 U.S.C. 154(b) by 0 days.

(21) Appl. No.: 09/503,724

(22) Filed: Feb. 15, 2000

(30) Foreign Application Priority Data

Mar. 5, 1999 (JP) ............................................ 11-058843

(51) Int. Cl.[7] .............................. H04N 7/18; H04N 9/47
(52) U.S. Cl. ......................................... 348/89; 382/110
(58) Field of Search .............................. 348/89; 382/110

(56) References Cited

U.S. PATENT DOCUMENTS

| | | | | |
|---|---|---|---|---|
| 4,850,291 A | * | 7/1989 | Masuko et al. | 111/7.2 |
| 4,919,060 A | * | 4/1990 | Cady | 111/128 |
| 5,130,545 A | * | 7/1992 | Lussier | 250/458.1 |
| 5,220,876 A | * | 6/1993 | Monson et al. | 111/130 |
| 5,622,124 A | * | 4/1997 | Smith et al. | 111/121 |
| 5,884,224 A | * | 3/1999 | McNabb | 702/2 |
| 5,974,348 A | * | 10/1999 | Rocks | 701/28 |
| 6,052,187 A | * | 4/2000 | Krishnan et al. | 356/364 |
| 6,160,902 A | * | 12/2000 | Dickson | 382/110 |
| 6,199,000 B1 | * | 3/2001 | Keller et al. | 701/50 |

* cited by examiner

*Primary Examiner*—Chris Kelley
*Assistant Examiner*—Charles Parsons
(74) *Attorney, Agent, or Firm*—Arent Fox PLLC

(57) ABSTRACT

A method of and apparatus for performing a topdressing operation on an agriculture field have been provided. The method comprises the steps of: individually and continuously taking pictures of crops planted on a field to obtain crop picture data; processing the crop picture data of each crop to investigate the growing state of each crop; performing a topdressing operation in view of the growing state of each crop. The apparatus comprises a movable main body such as a tractor; a topdressing device provided on the rear side of the movable main body; a video camera provided on the front side of the movable main body; a picture data processing computer adapted to process picture data fed from the video camera so as to measure the leaf size of each crop; a topdressing operation controlling computer adapted to produce a command to the topdressing device to control an amount of a fertilizer to be applied to a crop.

7 Claims, 5 Drawing Sheets

TOPDRESSING METHOD AND APPARATUS THEREFOR

BACKGROUND OF THE INVENTION

The present invention relates to a topdressing method and an apparatus therefor, particularly to a method of and an apparatus for properly supplying fertilizer to row crops on a field.

For a large field on which there are planted a great number of crops such as vegetables, it is usually required to establish a technique for preventing uneven growth which is otherwise caused due to uneven transplanting or uneven germination. However, a conventional topdressing operation can only uniformly supply fertilizer to row crops on a field, in a manner such that each crop receives the same amount of fertilizer regardless of whether the crop has a large or small size (i.e., an actual growing state of a crop). As a result, it is difficult to prevent the uneven growth of the row crops on a field.

SUMMARY OF THE INVENTION

It is an object of the present invention to provide an improved topdressing method and an apparatus therefor, in order that each crop may receive an appropriate amount of fertilizer in view of its actual growing state such as its size, thereby ensuring an even growth of a great number of row crops planted on a field, so as to solve the above-mentioned problem peculiar to the above-discussed prior art.

According to the present invention, there is provided a method of performing a topdressing operation on an agriculture field, comprising the steps of: individually and continuously taking pictures of crops planted on a field to obtain crop picture data; processing the crop picture data of each crop to investigate the growing state of each crop; performing a topdressing operation in view of the growing state of each crop.

In one aspect of the present invention, the topdressing operation includes producing a commend to a topdressing device to control an amount of a fertilizer to be applied to a crop in accordance with its size which has been detected.

According to the present invention, there is also provided an apparatus for performing a topdressing operation on an agriculture field, comprising: a movable main body such as a tractor; a topdressing device provided on the rear side of the movable main body for applying an amount of fertilizer to each crop; a video camera provided on the front side of the movable main body in a manner such that said video camera can take pictures of row crops planted on the field while travelling on the filed; a picture data processing computer adapted to process picture data fed from the video camera so as to measure the leaf size of each crop; a topdressing operation controlling computer adapted to produce a command to the topdressing device to control an amount of a fertilizer to be applied to a crop, in accordance with picture dada fed from the picture data processing computer.

In another aspect of the present invention, the topdressing device includes an electric clutch and a liquid fertilizer nozzle, the electric clutch is adapted to control the operation of the liquid fertilizer nozzle, in accordance with a control signal fed from the topdressing operation controlling computer.

In a further aspect of the present invention, the topdressing device includes a liquid fertilizer tank and an electromagnetic valve, the electromagnetic valve is adapted to control the flow rate of a liquid fertilizer flowing from the tank to the liquid fertilizer nozzle, in accordance with a control signal fed from the topdressing operation controlling computer.

The above objects and features of the present invention will become better understood from the following description with reference to the accompanying drawings.

DETAILED DESCRIPTION OF THE PREFERRED EMBODIMENTS

Figure 1:
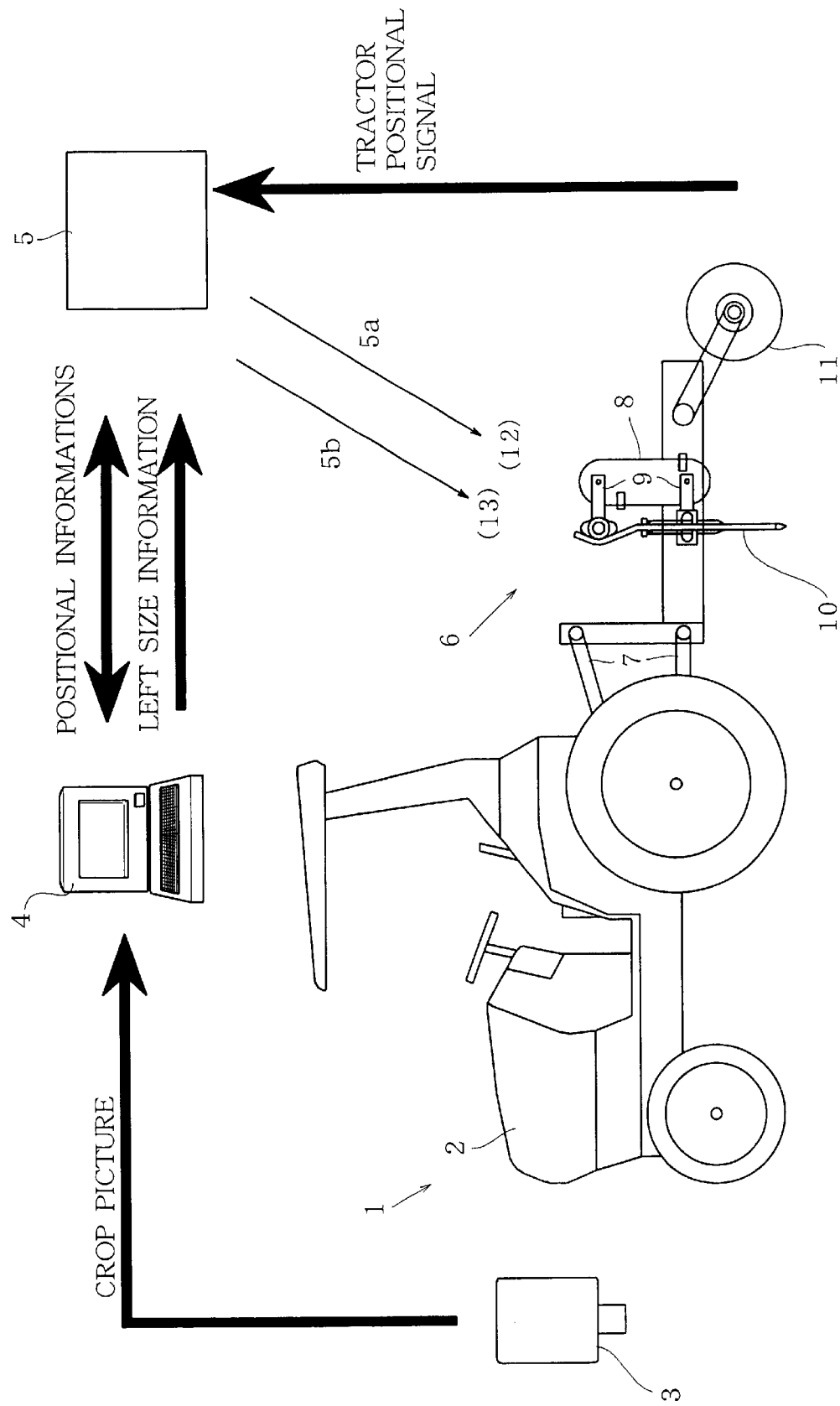
FIG. 1 is an explanatory view schematically indicating the constitution of a topdressing apparatus formed according to the present invention.

Referring to FIG. 1, a topdressing apparatus 1 of the present invention includes a tractor 2 serving as a main body of the apparatus, a video camera 3 provided on the front side of the tractor 2. The video camera 3 is mounted on the tractor 2 in a manner such that when the tractor 2 travels on a field, the video camera 3 can face downwardly to take pictures of the row crops.

The topdressing apparatus 1 further includes a picture data processing computer 4 (a note-type computer) and a topdressing operation controlling computer 5 (a board-type computer). The computer 4 is adapted to process a sort of picture data fed from the video camera 3 so as to measure the leaf size of each row crop. The topdressing operation controlling computer 5 is adapted to produce control signals in accordance with the leaf size information fed from the picture data processing computer 4. The control signals are fed to a topdressing device 6 provided on the rear side of the tractor 2, so as to enable the topdressing device 6 to perform an appropriate topdressing operation for each crop.

In detail, the topdressing device 6 is attached to the rear side of the tractor 2 by virtue of a link mechanism 7, in a manner such that the device 6 may be moved in the vertical direction with respect to the tractor 2.

In more detail, the topdressing device 6 includes a liquid fertilizer tank (not shown) containing a predetermined amount of a liquid fertilizer, a liquid fertilizer pump (not shown) for supplying the liquid fertilizer from the tank to a liquid fertilizer nozzle 10 (the nozzle 10 is one element of the topdressing device 6).

Further, the topdressing device 6 includes a nozzle driving wheel 11 (also serving as a tractor position sensor), a nozzle driving mechanism 8 for receiving a driving force from the nozzle driving wheel 11 so as to drive the nozzle 10. As shown in FIG. 1, the nozzle 10 is supported by a pair of crank arms 9 arranged up and down on a case housing the mechanism 8, such that the nozzle 10 is pivotable in the vertical direct ion so as to be movable from a spatial posit ion above the soil surface to a position below the soil surface.

The nozzle driving wheel 11 (also serving as a tractor position sensor) is comprised of a ground engaging wheel and a rotary encoder. In fact, the wheel 11 is attached to the rearmost end of the topdressing device 6.

Moreover, the topdressing device 6 includes an electric clutch 12 and an electromagnetic valve 13. The electric clutch 12 is provided to be ON or OFF in accordance with a driving signal 5a fed from the topdressing operation controlling computer 5, so as to control the operation of the nozzle 10. The electromagnetic valve 13 is provided to control the flow rate of a liquid fertilizer being supplied from the pump to the nozzle 10, in accordance with a driving signal 5b fed from the topdressing operation controlling computer 5.

When the tractor 2 travels on a field, the video camera 3 is operated to take a picture of each crop (for example, cabbage). The picture data is then fed to the picture data processing computer 4 to be processed in the procedures shown in FIG. 2 and FIG. 3.

Figure 2:
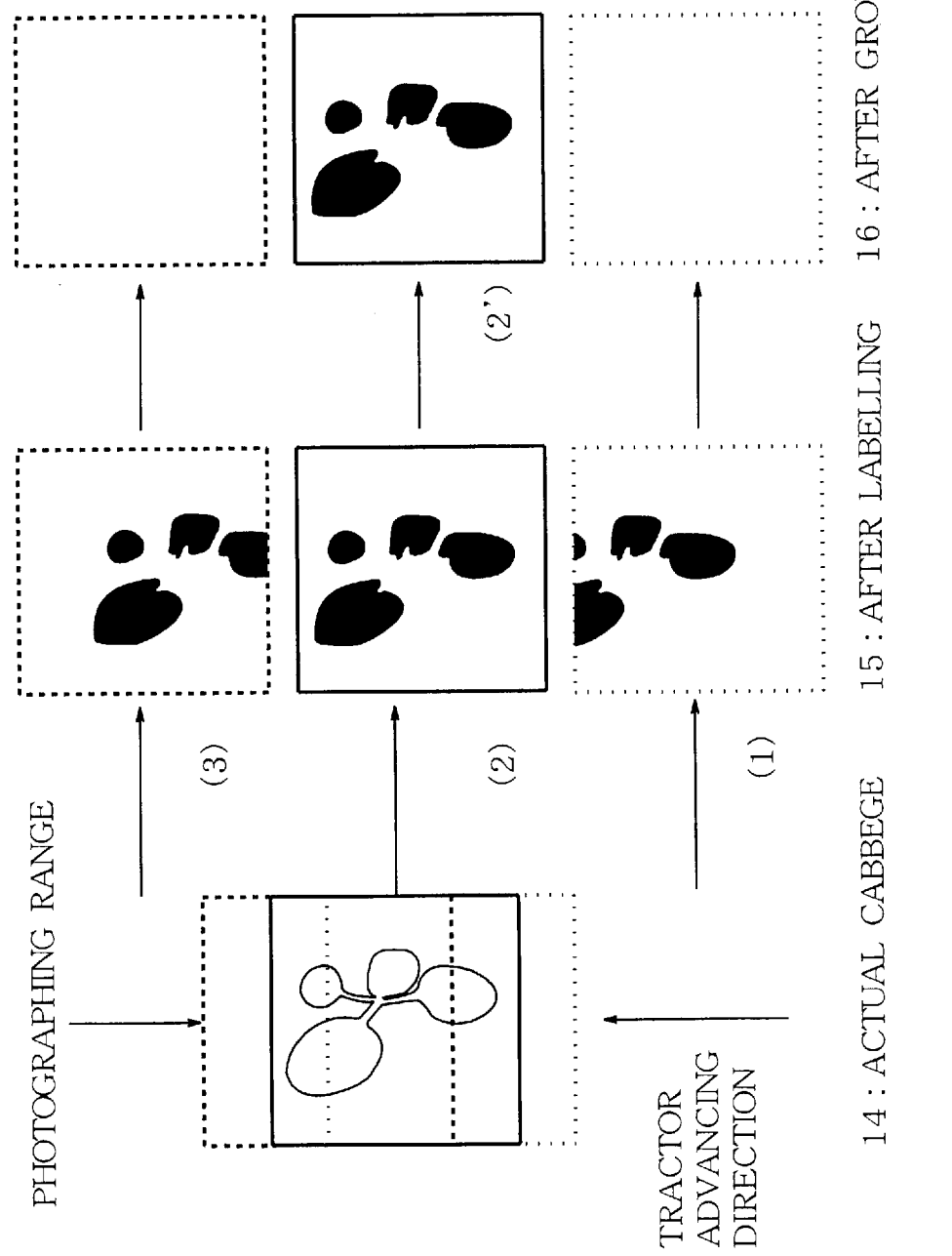
FIG. 2 is an explanatory view schematically indicating a principle for processing picture data according to the present invention.

Referring to FIG. 2, one picture frame (indicating a crop such as a cabbage) is taken from an actual cabbage 14, with the use of the video camera 3.

Figure 3:
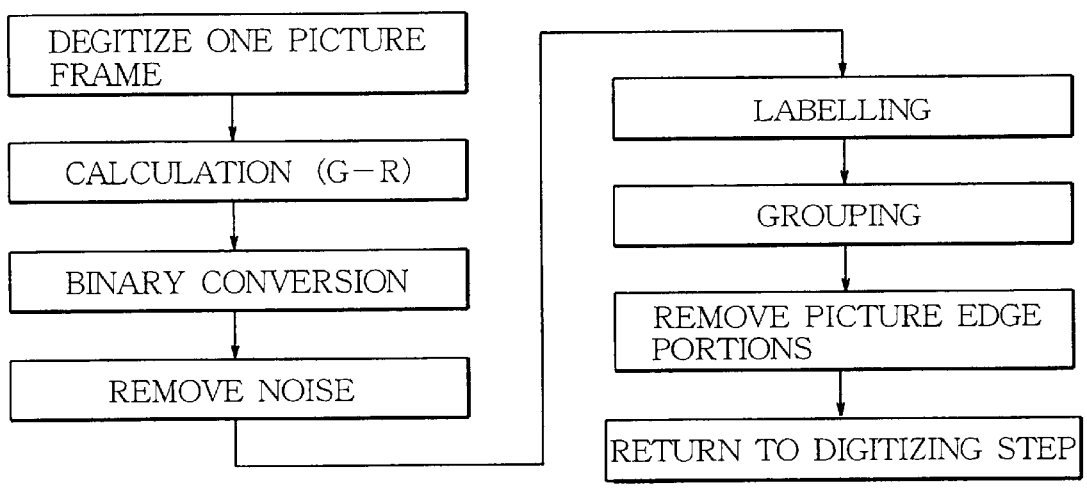
FIG. 3 is a flowchart indicating a procedure for processing picture data according to the present invention.

Referring to FIG. 3, the picture frame is digitized at a digitizing step and is then subjected to a calculation treatment (G-R) to remove red portions from green portions of picture data. The calculated result is converted into binary data, and is subjected to a noise removal treatment to remove unnecessary signals, followed by a labelling treatment in which each picture is provided with an appropriate number (1), (2) or (3) . . . , shown at 15 in FIG. 2.

Subsequently, a grouping treatment is executed so that the above pictures are classified in order that a useful picture (2') derived from a picture (2) is extracted. The pictures obtained after the grouping treatment are all shown at 16 in FIG. 2.

The useful picture (2') is further processed so as to remove unwanted picture edge portions thereof (FIG. 3), and is used as a crop leaf size information so as to be fed, together with a crop positional information, to the topdressing operation controlling computer 5 (FIG. 1).

On the other hand, a driving force obtained through the rotation of the ground engageable nozzle driving wheel 11 is transmitted to the nozzle driving mechanism 8, in accordance with a command (a control signal) fed from the topdressing operation controlling computer 5, thereby rendering the nozzle 10 to pivot in a predetermined manner. Further, tractor positional information fed from the rotary encoder (serving as a position sensor contained in the ground engageable wheel 11) is fed to the topdressing operation controlling computer 5. Meanwhile, the same positional information is further fed through the computer 5 to the picture data processing computer 4.

The topdressing operation controlling computer 5 is adapted to produce a nozzle driving signal 5a and a valve driving signal 5b, all in accordance with the leaf size information fed from the picture data processing computer 4. The nozzle driving signal 5a and the valve driving signal 5b are thus applied to the topdressing device 6, so as to enable the topdressing device 6 to operate properly in view of an actual growing state of an individual crop.

In detail, once the nozzle driving signal 5a is produced from the computer 5, the electric clutch 12 becomes ON so that a driving force transmitted from the ground engageable wheel 11 is transmitted to the nozzle driving mechanism 8, thereby rendering the nozzle 10 to rotate in the counter clockwise direction (FIG. 1) through the pair of crank arms 9, 9. In more detail, the nozzle 10 is moved from a position above the soil surface into the soil near a crop, completing one rotation until it is returned to a position above the soil surface.

The valve driving signal 5b is produced by the computer 5 to control the electromagnetic valve 13, in a manner such that when the nozzle 10 is inserted into the soil, the electromagnetic valve 13 will be opened only for a necessary time in accordance with the leaf size information fed from the picture data processing computer 4, thereby properly adjusting an amount of the liquid fertilizer being supplied from the tank (not shown) to the nozzle 10. In this way, a relatively large amount of liquid fertilizer is applied to a crop having a relatively small leaf size (indicating a retarded growth), while a relatively small amount of liquid fertilizer is applied to a crop having a relatively large leaf size (indicating an advanced growth), thereby ensuring an even and uniform growth of all the crops planted on a large-scale field.

When the track 2 is travelling on a field, the video camera 3 can continuously take picture of row crops planted on the field, with said video camera 3 being separated 80 cm from the soil surface. The continuously taken pictures are continuously sent to an input board of the picture data processing computer 4 at a rate of 20 frames per second.

On the other hand, the tractor positional information fed from the nozzle driving wheel 11 (also serving as a tractor position sensor) is fed to the topdressing operation controlling computer 5, and is further fed from the computer 5 to the picture data processing computer 4 every five micro seconds.

The picture data processing computer 4 is adapted to recognize the row crops individually so as to measure the leaf size of each crop.

In this way, a value of fertilizer amount (for topdressing) calculated in accordance with a leaf size, together with a crop positional information obtained when a crop picture is taken, are all fed to the topdressing operation controlling computer 5.

Since the crop positional information may be corrected by both a position sensing value and a crop center position within a video picture, there would be no change in said crop positional information even if the same crop picture is moved within the finder of the video camera. Thus, the topdressing operation controlling computer 5 can easily calculate a position for the nozzle 10 to reach, in accordance with the crop positional information and a distance between the video camera 3 and the nozzle 10. Then, a calculated position and a calculated fertilizer amount are stored in a memory. Subsequently, an actual present nozzle position is compared with a nozzle position stored in the memory. Once it is detected that the nozzle 10 has reached a correct desired position as stored in the memory, the electric clutch 12 will be made ON so as to enable the nozzle 10 to rotate in a predetermined manner.

Figure 4:
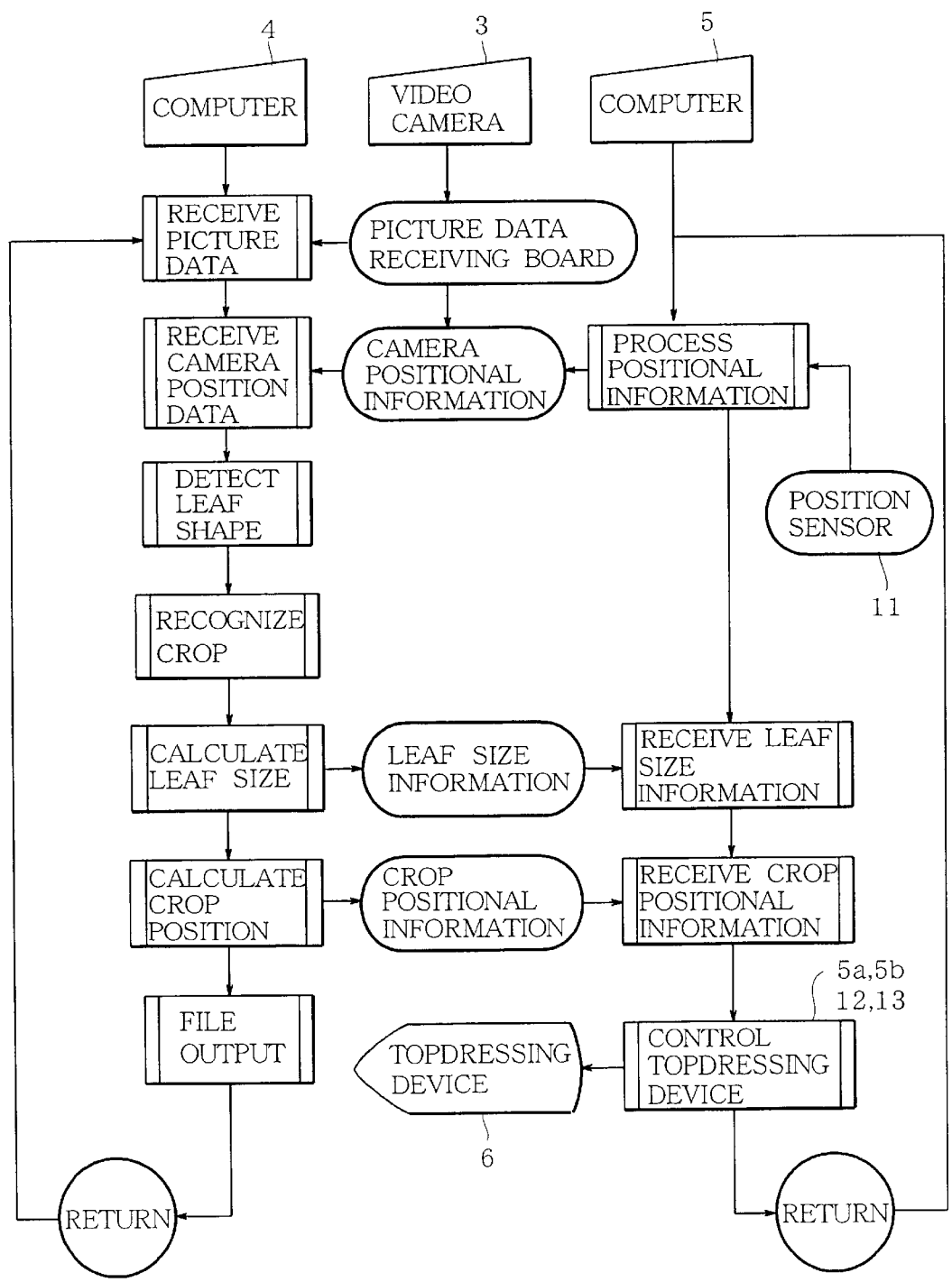
FIG. 4 is a flow chart indicating a relationship between picture data processing operation and topdressing controlling operation in the present invention.

FIG. 4 is a flow chart indicating a relationship between the picture data processing operation and the topdressing controlling operation. As shown in FIG. 4, a crop picture data and a camera position information are fed from the video camera 3 to the picture data processing computer 4. Meanwhile, a tractor positional information is also fed to the computer 4. Then, in the picture data processing computer 4, the leaf shape of a crop is detected so as to recognize the crop and to calculate the leaf size thereof. Afterwards, the leaf size information is fed to the topdressing operation controlling computer 5 and a crop positional information is also fed to the computer 5. Then, the topdressing operation controlling computer 5 operates to control the topdressing device 6 in accordance with the leaf size information and the crop positional information, so as to effect a proper topdressing operation suitable for an individual crop, by supplying an appropriate amount of liquid fertilizer to the crop in view of its actual growing state.

Figure 5:
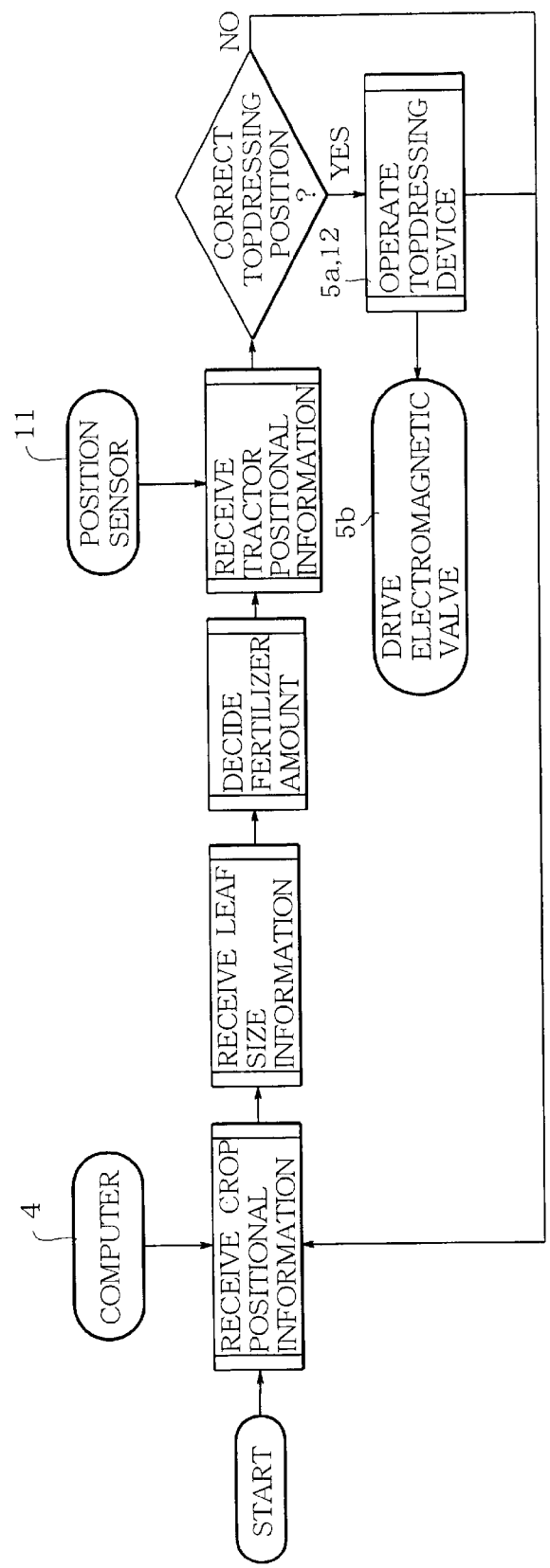
FIG. 5 is a flow chart indicating the operation of a topdressing operation controlling computer used in the present invention.

FIG. 5 is a flow chart indicating the operation of the topdressing operation controlling computer 5 for controlling the topdressing device 6. As show in FIG. 5, crop positional information and leaf size information are fed from the picture data processing computer 4 to the topdressing operation controlling computer 5, so that an appropriate amount of fertilizer may be decided. Further, a tractor positional information is fed from the nozzle driving wheel 11 (also serving as a tractor position sensor) to the computer 5 to determine whether or not the topdressing device 6 has arrived at a correct topdressing position. If an answer is YES, the topdressing device 6 is operated to open the electromagnetic valve 13. If NOT, the program goes back to a former step for the computer 5 to receive the crop positional information.

In this way, with the use of the present invention, it is possible to perform correct topdressing operation so as to supply an appropriate amount of liquid fertilizer to each crop corresponding to its actual growing state. Accordingly, a relatively large amount of liquid fertilizer is applied to a crop having a relatively small leaf size (indicating a retarded growth), while a relatively small amount of liquid fertilizer is applied to a crop having a relatively large leaf size (indicating an advanced growth), thereby enabling all the crops on a field to grow into almost the same size. Therefore, during a harvest season, it is allowed to harvest the crops in the same manner using an identical harvester (equipment), thus effectively promoting agricultural automation.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of performing a topdressing operation on an agriculture field, comprising the steps of:
   - individually and continuously taking pictures of crops planted on the agriculture field to obtain crop picture data;
   - processing the crop picture data of each crop to investigate a growth state of each crop;
   - using a topdressing device having a ground engageable nozzle driving wheel which transmits a driving force that drives a fertilizer applying nozzle of the topdressing device, and wherein the driving wheel includes a position sensor which transmits a signal indicating a position of the topdressing device; and
   - performing a topdressing operation on each crop in view of the growth state of each crop relative to the indicated position of the topdressing device.

2. The method according to claim 1, wherein the topdressing operation includes producing a command to the topdressing device to control an amount of a fertilizer applied by the nozzle to each crop in accordance with a detected size of each crop leaf.

3. An apparatus for performing a topdressing operation on an agriculture field, comprising:
   - a movable main body, wherein said movable main body is a tractor;
   - a topdressing device provided on a rear side of the movable main body for applying an amount of fertilizer to each crop, the topdressing device having a ground engageable nozzle driving wheel and a fertilizer applying nozzle, wherein the ground engageable nozzle driving wheel includes a position sensor, wherein the driving wheel transmits a signal indicating a position of the topdressing device and transmits a driving force that drives the fertilizer applying nozzle;
   - a video camera provided on a front side of the movable main body in a manner wherein said video camera takes pictures of row crops planted on the agriculture field while traveling thereon;
   - a picture data processing computer adapted to process picture data fed from the video camera to measure a size of each crop leaf; and
   - a topdressing operation controlling computer adapted to provide a command to the topdressing device to control an amount of a fertilizer applied to a specific crop from the fertilizer applying nozzle of the topdressing device in accordance with picture data fed from the picture data processing computer and positional information of the topdressing device provided by the position sensor of the driving wheel.

4. The apparatus according to claim 3, wherein the topdressing device further includes an electric clutch, wherein the fertilizer applying nozzle is a liquid fertilizer nozzle and the electric clutch controls operation of the liquid fertilizer nozzle according to a control signal fed from the topdressing operation controlling computer.

5. The apparatus according to claim 4, wherein the topdressing device includes a liquid fertilizer tank and an electromagnetic valve, wherein the electromagnetic valve controls a flow rate of a liquid fertilizer flowing from the tank to the liquid fertilizer nozzle according to a control signal fed from the topdressing operation controlling computer.

6. The method according to claim 1, wherein the ground engageable nozzle driving wheel is attached to a rearmost end of the topdressing device.

7. The apparatus according to claim 3, wherein the ground engageable nozzle driving wheel is attached to a rearmost end of the topdressing device.

* * * * *

UNITED STATES PATENT AND TRADEMARK OFFICE
CERTIFICATE OF CORRECTION

PATENT NO.    : 6,750,898 B1
DATED         : June 15, 2004
INVENTOR(S)   : Ishida et al.

It is certified that error appears in the above-identified patent and that said Letters Patent is hereby corrected as shown below:

Title page,
Item [73], Assignee, please change the first Assignee to read:
-- Incorporated Administrative Agency National Agriculture and Bio-oriented Research Organization, Ibaraki (JP) --.

Signed and Sealed this

Twelfth Day of October, 2004

JON W. DUDAS
*Director of the United States Patent and Trademark Office*